United States Patent [19]

Yamada et al.

[11] 3,980,678
[45] Sept. 14, 1976

[54] ANTHRAQUINONE DISPERSE DYES

[75] Inventors: Eiji Yamada, Ibaragi; Masao Nishikuri, Hirakata; Ryuji Kanou, Minoo; Taizo Ohshima, Sakai, all of Japan

[73] Assignee: Sumitomo Chemical Company, Limited, Japan

[22] Filed: Jan. 28, 1974

[21] Appl. No.: 436,896

[30] Foreign Application Priority Data
Jan. 31, 1973   Japan................................. 48-13098
Sept. 14, 1973   Japan................................ 48-104060

[52] U.S. Cl................................ 260/380; 8/39 C; 8/40; 260/383
[51] Int. Cl.²............................................. C07C 97/26
[58] Field of Search............................ 260/383, 380

[56] References Cited
UNITED STATES PATENTS

| | | | |
|---|---|---|---|
| 3,174,983 | 3/1965 | Ramanathan....................... | 260/380 |
| 3,178,455 | 4/1965 | Grossman et al.................. | 260/380 |
| 3,538,129 | 11/1970 | Sato et al........................... | 260/380 |
| 3,754,858 | 8/1973 | Hederich et al.................... | 260/380 |
| 3,836,549 | 9/1974 | Yamada.............................. | 260/380 |

FOREIGN PATENTS OR APPLICATIONS

| | | | |
|---|---|---|---|
| 1,209,680 | 1/1966 | Germany............................ | 260/380 |
| 44-12039 | 9/1969 | Japan.................................. | 260/380 |
| 835,819 | 5/1960 | United Kingdom................. | 260/380 |
| 1,090,259 | 11/1967 | United Kingdom | |

*Primary Examiner*—Arthur P. Demers
*Attorney, Agent, or Firm*—Stevens, Davis, Miller & Mosher

[57] ABSTRACT

A disperse dye of the formula,

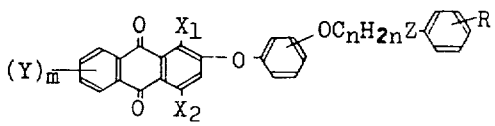

wherein $X_1$ and $X_2$ each are an amino or hydroxyl group, Y is a hydrogen or halogen atom, Z is an oxygen or sulfur atom or a direct linkage, R is a hydrogen or halogen atom or a lower alkyl or lower alkoxy group, $n$ is an integer of from 1 to 4, and $m$ is 1 or 2, which is suitable for dyeing synthetic fibers such as polyester fibers with a high color value and good fastnesses.

2 Claims, No Drawings

ANTHRAQUINONE DISPERSE DYES

The present invention relates to a novel anthraquinone disperse dyes suitable for dyeing synthetic fibers such as polyester, polyamide and polyacrylonitrile fibers.

Various dyes suitable for dyeing aforesaid synthetic fibers are heretofore known, but are not always satisfactory in dye properties such as brilliancy, color value, fastnesses and the like.

An object of the present invention is to provide a novel anthraquinone disperse dye having more excellent dye properties, particularly fastnesses and brilliancy, compared with those of known dyes. Other object of the present invention will be apparent from the following description.

These objects are accomplished by providing a novel disperse dye of the formula (I),

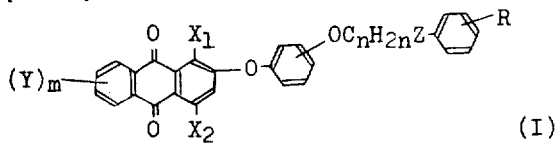

wherein $X_1$ and $X_2$ each are an amino or hydroxyl group, Y is a hydrogen or halogen atom, Z is an oxygen or sulfur atom or a direct linkage, R is a hydrogen or halogen atom, or an alkyl or alkoxy group, $n$ is an integer of from 1 to 4, and $m$ is 1 and 2.

In the present invention each term "alkyl" and "alkoxy" is intended to mean an alkyl group having 1 to 5 carbon atoms and an alkoxy group having 1 to 5 carbon atoms.

The novel disperse dye of the present invention is prepared by reacting an o-, m- or p-hydroxyphenoxyanthraquinone of the formula (II);

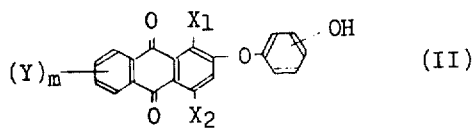

wherein $X_1$, $X_2$, Y, and m are each as defined above, with a compound of the formula (III);

wherein D is an aromatic or aliphatic residue, R, Z and n are as defined above, or with a compound of the formula (IV);

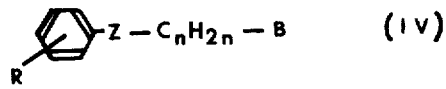

wherein B is a chlorine or bromine atom, and R, Z and n are as defined above, or by reacting a β-haloanthraquinone of the formula (V);

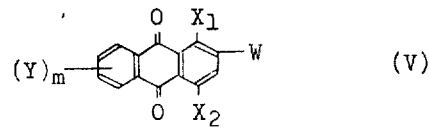

wherein W is a chlorine or bromine atom, and $X_1$, $X_2$, Y and m are as defined above, with an ether of the formula (VI);

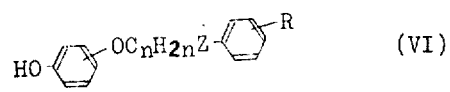

wherein R, Z and n are as defined above.

The compounds of the formula (II) employed in the present invention more specifically include, 1-amino-2-(4'-hydroxyphenoxy)-4-hydroxyanthraquinone, 1-amino-2-(3'-hydroxyphenoxy)-4-hydroxyanthraquinone, 1-amino-2-(2'-hydroxyphenoxy)-4-hydroxyanthraquinone, 1-amino-2-(4'-hydroxyphenoxy)-4-hydroxy-5-chloroanthraquinone, 1-amino-3-(4'-hydroxyphenoxy)-4-hydroxyanthraquinone, 1-amino-2-(4'-hydroxyphenoxy)-4-hydroxy-5-bromoanthraquinone, 1,4-dihydroxy-2-(4'-hydroxyphenoxy)-anthraquinone, 1,4-diamino-2-(4',3' or 2'-hydroxyphenoxy)-anthraquinone, 1,4-dihydroxy-2-(4'-hydroxyphenoxy)-6,7-dichloroanthraquinone, and 1,4-dihydroxy-2-(3'-hydroxyphenoxy)-anthraquinone.

The compounds of the formula (III) include p-toluenesulfonates and benzenesulfonates such as benzyl, phenethyl, phenoxyethyl, p-methylbenzyl, p-chlorobenzyl, p-bromobenzyl, p-methylphenethyl, p-ethylphenethyl, p-chlorophenethyl, m-chlorophenethyl, p-bromophenethyl, p-methoxyphenethyl, p-methylphenoxyethyl, p-bromophenoxyethyl, thiophenoxyethyl, 1-methyl-2-phenoxyethyl or 1-ethyl-2-phenoxyethyl, p-toluenesulfonate and benzenesulfonate.

The compounds of the formula (IV) include benzyl chloride, benzyl bromide, phenethyl chloride, phenethyl bromide and phenoxyethyl chloride.

The reaction between the compound of the formula (II) and the compound of the formula (III) or (IV) can be carried out at from 50° to 150°C in the presence of a base in an inert solvent or a polar solvent. The inert solvents include benzene, toluene, chlorobenzene, dichlorobenzene, nitrobenzene, perchloroethylene, and trichloroethylene. The polar solvents include dimethylsulfoxide, dimethylformamide, N-methylpyrrolidone and dimethylacetamide. The bases include pyridine, piperidine, sodium carbonate, potassium carbonate and potassium hydroxide. When two or more of the compounds of the formula (III) or (IV) are used in combination, aimed dyes are obtained as a mixture.

The β-haloanthraquinone of the formula (V) includes, for example, 1-amino-2-bromo-4-hydroxyanthraquinone, 1-amino-2-chloro-4-hydroxyanthraquinone, 1-amino-2-bromo-4-hydroxy-5-chloroanthraquinone, 1,4-dihydroxy-2-bromoanthraquinone, 1,4-diamino-2-bromoanthraquinone and 1,4-dihydroxy-2-bromo-6,7-dichloroanthraquinone.

The ether of the formula (VI) includes, for example, hydroquinone monobenzyl ether, hydroquinone monophenethyl ether, hydroquinone monophenoxyethyl ether, hydroquinone monothiophenoxy ether and o- or m-isomers thereof. The reaction between the β-haloanthraquinone of the formula (V) and the ether of the formula (VI) can be carried out at a temperature ranging from 50° to 150°C in a dipolar aprotic solvent such as dimethylsulfoxide, dimethylformamide, N-methylpyrrolidone and dimethylacetamide, in the presence of a base such as pyridine, piperidine, sodium carbonate, potassium carbonate and potassium hydroxide.

The novel anthraquinone dyes of the formula (I) alone or in admixture of two or more thereof can be applied advantageously not only to dyeing of yarns, fabrics, loose fibers, knitted fabrics and non-woven fabrics made of various synthetic fibers including polyamides, polyacrylonitriles, polyesters and cellulose esters, but also to dyeing of blends and union fabrics thereof with natural fibers. Among these fibers, polyesters such as polyethyleneterephthalate, poly-1,4-cyclohexylene dimethylene terephthalate, and modified fibers thereof in which terephthalic acid is partially substituted with sebacic acid, isophthalic acid or hexahydroterephthalic acid, and cellulose esters such as cellulose triacetate and cellulose 2½-acetate are particularly preferred.

The materials can be dyed by various dyeing methods which are well known in the art, for example, an atmospheric or pressure dyeing at 80° to 130°C, carrier dyeing, thermosol dyeing including a dry heat treating at 180° to 220°C, solvent dyeing using perchloroethylene or trichloroethylene, heat transfer printing in which dyes printed on transfer paper are treated by a thermosol process at an atmospheric or under a reduced pressure, and printing using a high pressure steam. Thus, dyeings of a bright orange to violet shade having a high color value and very good fastnesses to light, washing, gas and finishing processes such as resin finishing are obtained.

The present invention will be illustrated more specifically with reference to the following examples which are only given for the purpose of illustration and are not to be interpreted as limiting.

In the examples all parts are by weight.

EXAMPLE 1

A mixture of 5.0 parts of 1-amino-2-(4'-hydroxyphenoxy)-4-hydroxyanthraquinone, 2.3 parts of sodium carbonate, 0.5 part of pyridine, 11.0 parts of phenethyl p-toluenesulfonate and 25 parts of o-dichlorobenzene, was heated to 120°C and kept at the same temperature for about 10 hours. After the disappearance of the starting materials was ascertained, the mixture was cooled to room temperature and diluted with methanol. The precipitated crystals were filtered, washed with methanol and water, and dried. Thus, 5.2 parts of the compound of the formula (m.p. 156° – 160°C) were obtained.

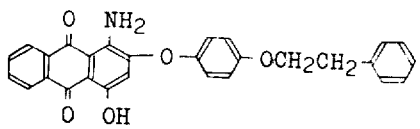

The compound thus obtained gave dyeings of a bright red shade on polyethyleneterephthalate having excellent fastnesses to light, sublimation, washing and the like.

EXAMPLE 2

A mixture of 5.0 parts of 1-amino-2-(4'-hydroxyphenoxy)-4-hydroxyanthraquinone, 2.5 parts of potassium carbonate, 0.5 part of pyridine, 10.0 parts of phenoxyethyl p-toluenesulfonate and 20.0 parts of o-dichlorobenzene was heated to 120°C and kept at the same temperature for about 6 hours. After the disappearance of the starting materials was ascertained, the mixture was diluted with methanol. The precipitated crystals were filtered, washed with methanol and water, and then dried to give 5.6 parts of a new dye of the formula (m.p. 177° to 183°C).

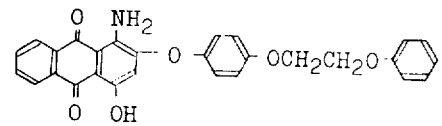

The compound dyed polyethyleneterephthalate fiber in bright red shade.

EXAMPLE 3

A mixture of 5.0 parts of 1-amino-2-(4'-hydroxyphenoxy)-4-hydroxyanthraquinone, 40 parts of ethyleneglycol monomethyl ether, 5.4 parts of benzyl chloride and 4.5 parts of sodium carbonate was heated to 90°C and kept at the same temperature for about 4 hours. After the disappearance of the starting materials was ascertained, the mixture was cooled to room temperature and filtered to separate crystals, which were washed with water, and dried. Thus, 3.5 parts of a new dye of the following formula was obtained (m.p. 216° to 217°C).

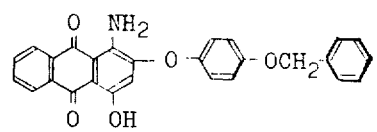

The compound dyed polyethyleneterephthalate fiber in a bright red shade.

EXAMPLE 4

A mixture of 4.0 parts of 1-amino-2-bromo-4-hydroxyanthraquinone, 10 parts of dimethylsulfoxide, 1.1 parts of potassium carbonate and 20 parts of hydroquinone monobenzyl ether, was heated to 120°C, and kept at the same temperature for about 3 hours. After the disappearance of the starting materials was ascertained, the mixture was cooled to a room temperature, and diluted with 40 parts of methanol. The precipitated crystals were filtered, washed with methanol and water, and then dried to give 4.6 parts of the same dye as in Example 3.

EXAMPLES 5 TO 21

According to the procedure similar to that described in Example 1 or 2, o-, m- or p-hydroxyphenoxyanthraquinones shown in the following Table was reacted with a compound of the formula (III), whereby the objective dyes shown in the right column of the Table were obtained. The dyes shown in the Table can also be prepared by reacting o-, m- or p-hydroxyphenoxyanthraquinone with the compound of the formula (IV), (for example, according to the procedure similar to that of Example 3), or by reacting the β-haloanthraquinone (V) with the compound (VI), (for example, according to the procedure similar to that of Example 4).

| Example No. | Hydroxyphenoxy-anthraquinone | Compound of the formula (III) | Dye obtained and shade on polyesters |
|---|---|---|---|
| 5 | 1-amino-2-(3-hydroxyphenoxy)-4-hydroxyanthraquinone | 4-methylphenyl 2-phenylethyl sulfonate (CH₃-C₆H₄-SO₃CH₂CH₂-C₆H₅) | 1-amino-2-(3-(2-phenylethoxy)phenoxy)-4-hydroxyanthraquinone (Bright red) |
| 6 | 1-amino-2-(4-hydroxyphenoxy)-4-hydroxy-8-bromoanthraquinone | " | corresponding 2-phenylethoxy derivative (Bluish red) |
| 7 | 1-amino-2-(4-hydroxyphenoxy)-4-hydroxy-5-chloroanthraquinone | " | corresponding 2-phenylethoxy derivative (Bluish red) |
| 8 | 1-amino-2-(4-hydroxyphenoxy)-4-hydroxyanthraquinone | 4-methylphenyl 2-(4-methylphenyl)ethyl sulfonate | corresponding 2-(4-methylphenyl)ethoxy derivative (Bright red) |
| 9 | " | 4-methylphenyl 2-(4-chlorophenyl)ethyl sulfonate | corresponding 2-(4-chlorophenyl)ethoxy derivative (Bright red) |

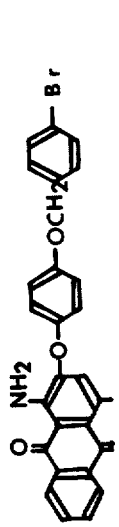

| Example No. | Hydroxyphenoxy-anthraquinone | Compound of the formula (III) | Dye obtained and shade on polyesters |
|---|---|---|---|
| 16 | 1,4-dihydroxy-2-(4-hydroxyphenoxy)-6,7-dichloroanthraquinone | CH₃-C₆H₄-SO₃CH₂CH₂-S-C₆H₅ | 2-(4-(2-phenylthioethoxy)phenoxy)-1,4-dihydroxy-6,7-dichloroanthraquinone (Orange) |
| 17 | 1-amino-2-(4-hydroxyphenoxy)-4-hydroxyanthraquinone | " | 1-amino-2-(4-(2-phenylthioethoxy)phenoxy)-4-hydroxyanthraquinone (Bright red) |
| 18 | " | CH₃-C₆H₄-SO₃CH(CH₃)CH₂-O-C₆H₅ | 1-amino-2-(4-(1-methyl-2-phenoxyethoxy)phenoxy)-4-hydroxyanthraquinone (Bright red) |
| 19 | " | CH₃-C₆H₄-SO₃CH(C₂H₅)CH₂-O-C₆H₅ | 1-amino-2-(4-(1-ethyl-2-phenoxyethoxy)phenoxy)-4-hydroxyanthraquinone (Bright red) |
| 20 | 1-amino-2-(2-hydroxyphenoxy)-4-hydroxyanthraquinone | CH₃-C₆H₄-SO₃CH₂CH₂-O-C₆H₅ | 1-amino-2-(2-(2-phenoxyethoxy)phenoxy)-4-hydroxyanthraquinone (Bright red) |
| 21 | 1-amino-2-(3-hydroxyphenoxy)-4-hydroxyanthraquinone | CH₃-C₆H₄-SO₃CH₂-O-C₆H₅ | 1-amino-2-(3-(phenoxymethoxy)phenoxy)-4-hydroxyanthraquinone (Bright red) |

EXAMPLE 22

A mixture of 3 parts of the compound of the formula,

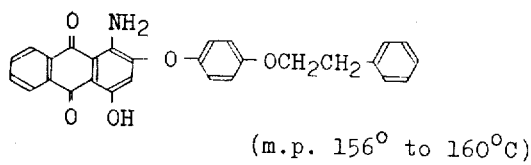

(m.p. 156° to 160°C)

7 parts of a dispersing agent containing sodium dinaphthylmethanedisulfonate as a main component, and 20 parts of water was pulverized in a ball mill for several hours. The dispersion thus obtained was spray-dried to give 10 parts of a dyeing agent. 25 Parts of polyethylene terephthalate spun yarns were introduced into a dye bath containing 1 part of the dyeing agent and 1,000 parts of water, and dyed at 130°C for 60 minutes under pressure. Then the dyed yarns were hot-rinsed, subjected to a reduction cleaning and dried to give dyeings of a bright red shade having a high color value. The dyeings had excellent allround fastnesses including light fastness and washing fastness after finishing processes such as antistatic finish, water-proofing finish, hand-adjusting finish and the like.

EXAMPLE 23

15 Parts of a new dye of the following formula,

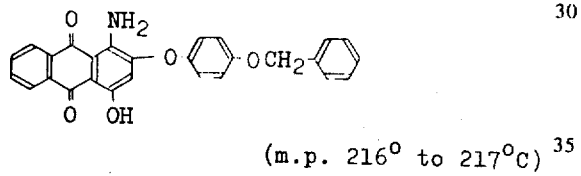

(m.p. 216° to 217°C)

were dispersed in 1,000 parts of water with a suitable amount of dispersing agent, and 1 part of sodium alginate was further added thereto. Fabric made of polyethylene terephthalate fibers was introduced into the dispersion, passed through mangles to squeeze the liquor in excess of about 60 % of the weight of the fabric, and pre-dried in a hot flue. The fabric was then given a dry-heat treating at 200°C for 90 seconds to fix the dye thereon. After the fabric was developed by the thermosol treatment, it was subjected to a reduction cleaning, rinsing and drying. The dyeings thus obtained had a bright red shade having fastness to light, sublimation and finishing processes.

EXAMPLE 24

10 Parts of a dyeing agent were obtained from 3 parts of the compound of the formula,

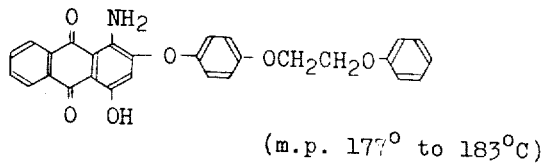

(m.p. 177° to 183°C)

in the same manner as described in Example 22. 1 Part of the dyeing agent thus obtained, 4 parts of o-phenylphenol, 2 parts of acetic acid were added to 1,000 parts of water to prepare a dye bath. 20 Parts of polyethylene terephthalate spun yarns were introduced into the dye bath and dyed at 100°C for 90 minutes. The dyed yarns were subjected to hot rinsing, reduction cleaning and then drying to give dyeings of a red shade having excellent fastnesses to light, sublimation, washing and finishing process.

What is claimed is:

1. A compound of the formula,

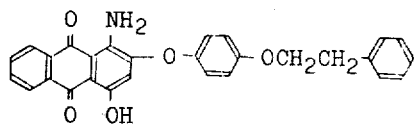

2. A compound of the formula,

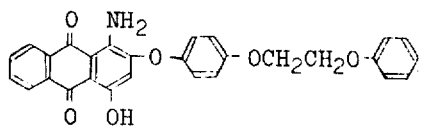

* * * * *